(12) United States Patent
Roh et al.

(10) Patent No.: US 12,427,355 B2
(45) Date of Patent: Sep. 30, 2025

(54) HOLDER FOR EXERCISE ASSISTANCE DEVICE

(71) Applicant: SAMSUNG ELECTRONICS CO., LTD., Suwon-si (KR)

(72) Inventors: Se-gon Roh, Suwon-si (KR); Younbaek Lee, Suwon-si (KR); Minhyung Lee, Suwon-si (KR); Byungjune Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 18/088,147

(22) Filed: Dec. 23, 2022

(65) Prior Publication Data

US 2023/0144959 A1    May 11, 2023

Related U.S. Application Data

(63) Continuation of application No. PCT/KR2021/001349, filed on Feb. 2, 2021.

(30) Foreign Application Priority Data

Jun. 26, 2020  (KR) .................. 10-2020-0078491
Nov. 25, 2020  (KR) .................. 10-2020-0160035

(51) Int. Cl.
*F16M 11/10* (2006.01)
*A63B 21/00* (2006.01)
(Continued)

(52) U.S. Cl.
CPC .... *A63B 21/00181* (2013.01); *A63B 21/4011* (2015.10); *A63B 71/04* (2013.01);
(Continued)

(58) Field of Classification Search
CPC ...... F16M 11/00; F16M 11/04; F16M 11/041; F16M 11/06; F16M 11/10; F16M 2200/06
(Continued)

(56) References Cited

U.S. PATENT DOCUMENTS 7,543,790 B2 *  6/2009  Starcher ................. A47B 97/08
                                                 248/463
9,420,712 B2 *  8/2016  Yang ..................... F16M 11/38
(Continued)

FOREIGN PATENT DOCUMENTS

KR   20-2012-0005384    7/2012
KR   10-2012-0138585   12/2012
(Continued)

OTHER PUBLICATIONS

International Search Report for PCT/KR2021/001349 mailed May 10, 2021, 5 pages.
(Continued)

*Primary Examiner* — Alfred J Wujciak
(74) *Attorney, Agent, or Firm* — Nixon & Vanderhye P.C.

(57) ABSTRACT

A holder for a wearable device such as an exercise assistance device where the holder may include: a main rod; a sliding rod capable of sliding with respect to the main rod; a gripper including a gripper base, which is connected to the sliding rod and can support an exercise assistance device, a gripper head, which is connected to the upper side of the gripper base and can face the rear surface of the exercise assistance device, and a gripper arm rotatably connected to the gripper head; and a control unit for controlling the operation of the gripper, wherein the gripper base rotates with respect to the sliding rod and tilts forward if the exercise assistance device is put on the gripper base, and the control unit can move the gripper arm so that at least a portion of the gripper arm can cover the front surface of the exercise assistance device.

15 Claims, 14 Drawing Sheets

(51) Int. Cl.
*A63B 71/04* (2006.01)
*F16M 11/04* (2006.01)
*F16M 11/28* (2006.01)

(52) U.S. Cl.
CPC ............ *F16M 11/041* (2013.01); *F16M 11/10* (2013.01); *F16M 11/28* (2013.01); *A63B 2220/24* (2013.01)

(58) Field of Classification Search
USPC ....... 248/146, 149, 154, 133, 139, 140, 142, 248/371, 372.1, 393, 395, 161, 157, 248/176.1, 177.1, 178.1, 176.3
See application file for complete search history.

(56) References Cited

U.S. PATENT DOCUMENTS

| | | | |
|---|---|---|---|
| 12,209,703 B2 * | 1/2025 | Xia | ........................ A47B 19/00 |
| 2014/0100492 A1 | 4/2014 | Nagasaka | |
| 2016/0081870 A1 | 3/2016 | Lee et al. | |
| 2016/0310344 A1 | 10/2016 | Shimada et al. | |
| 2023/0154444 A1 * | 5/2023 | Johnson | ................. G10G 5/005 84/327 |

FOREIGN PATENT DOCUMENTS

| | | |
|---|---|---|
| KR | 10-2015-0113254 | 10/2015 |
| KR | 10-1678608 | 11/2016 |
| KR | 10-1748330 | 6/2017 |
| KR | 10-2017-0138286 | 12/2017 |
| KR | 10-2018-0135366 | 12/2018 |
| KR | 209951481 | 1/2020 |

OTHER PUBLICATIONS

Written Opinion of the ISA for PCT/KR2021/001349 mailed May 10, 2021, 3 pages.

* cited by examiner

HOLDER FOR EXERCISE ASSISTANCE DEVICE

CROSS-REFERENCE TO RELATED APPLICATIONS

This application is a continuation application of International Application No. PCT/KR2021/001349 designating the United States, filed on Feb. 2, 2021, in the Korean Intellectual Property Receiving Office and claiming priority to Korean Patent Application No. 10-2020-0078491, filed on Jun. 26, 2020, and Korean Patent Application No. 10-2020-0160035, filed on Nov. 25, 2020, in the Korean Intellectual Property Office, the disclosures of which are all hereby incorporated by reference herein in their entireties.

BACKGROUND

1. Field

Certain example embodiments relate to a holder for an exercise assistance device.

2. Description of Related Art

An exercise assistance device may be a mechanism and/or a device that helps patients or other users, unable to easily walk on their own due to any of various diseases, accidents, and the like, exercise for rehabilitation treatment. In a rapidly aging society, a growing number of people have experienced difficulty exercising normally or inconvenience in exercising, and there is an increasing interest in exercise assistance devices. An exercise assistance device may be worn on a body of a user to help the user exercise by providing a necessary muscular strength that allows the user to walk so that the user may exercise normally.

SUMMARY

Generally, people who wear an exercise assistance device may have physical disabilities. For these people, the process of putting on an exercise assistance device itself may be difficult. There is need for a holder that holds an exercise assistance device so that a user, e.g., with physical disabilities, may put on the exercise assistance device alone, possibly without the help of other people.

The above description is information the inventor(s) acquired during the course of conceiving the present disclosure, or already possessed at the time, and is not necessarily art publicly known before the present application was filed.

In an example embodiment, a holder for an exercise assistance device for holding an exercise assistance device may be provided, and the holder may include a main rod, a sliding rod slidable with respect to the main rod, a gripper including a gripper base connected, directly or indirectly, to the sliding rod and configured to support the exercise assistance device, a gripper head connected, directly or indirectly, to an upper side of the gripper base and facing a rear surface of the exercise assistance device, and a gripper arm rotatably connected, directly or indirectly, to the gripper head, and a controller configured to control an operation of the gripper, wherein, when the exercise assistance device is disposed on the gripper base, the gripper base may rotate with respect to the sliding rod and tilt forward, and the controller may move the gripper arm such that at least a portion of the gripper arm may cover a front surface of the exercise assistance device.

The holder may include a switch installed on the sliding rod, provided to be in contact with the gripper base when the gripper forms a predetermined angle with respect to the sliding rod, and configured to transmit an on-off signal to the controller, wherein the controller may control an operation of the gripper arm based on the on-off signal.

The gripper base may include a base body rotatably connected, directly or indirectly, to the sliding rod and a protruding part protruding from the base body.

The gripper may include a gripper spring having one end fixed to the sliding rod and another end fixed to the gripper base and configured to provide a restoring force to the gripper base.

The gripper spring may be a torsion spring.

The holder may include an angle sensor configured to measure an angle formed by the gripper base with respect to the sliding rod, and the controller may be configured to control an operation of the gripper arm based on angle information measured by the angle sensor.

According to an example embodiment, a holder for an exercise assistance device for holding an exercise assistance device may be provided, and the holder may include a main rod, a sliding rod slidable with respect to the main rod, a gripper connected, directly or indirectly, to the sliding rod and configured to support the exercise assistance device, a gravity compensation part provided inside the main rod and slidable along the main rod while supporting the sliding rod, and a gravity compensation spring having an upper end fixed to the main rod and a lower end fixed to the gravity compensation part.

The gravity compensation part may be in close contact with an inner side surface of the main rod such that the gravity compensation spring may remain in a deformed state.

The gravity compensation part may include a slider configured to support the sliding rod and having an accommodation space therein, a core part provided in the accommodation space of the slider, a moving part movable with respect to the slider in a direction perpendicular to a longitudinal direction of the main rod and provided to be in close contact with an inner side surface of the main rod, and a sub-spring configured to connect the core part and the moving part.

The slider may include a slider hole penetrating in a direction perpendicular to the longitudinal direction of the main rod, and the moving part may be movable along the slider hole.

The moving part may include a moving body connected, directly or indirectly, to the sub-spring and one or more of moving wheels rotatably installed on the moving body and provided to be in contact with the inner side surface of the main rod.

One or more of the moving wheel(s) may include a first moving wheel and a second moving wheel, and the sub-spring may be connected, directly or indirectly, to the moving body between the first moving wheel and the second moving wheel.

While being in surface contact with the inner side surface of the main rod, one or more of the moving wheels may move along the inner side surface of the main rod.

A plurality of moving parts may be provided, and the plurality of moving parts may be spaced apart from each other at regular intervals in a circumferential direction of the core part.

The holder for the exercise assistance device may include a contact ring provided on an upper end of the main rod and contacting a sliding rod.

According to an example embodiment, a holder for an exercise assistance device for holding an exercise assistance device may be provided, and the holder may include a main rod, a sliding rod slidable with respect to the main rod, a gripper connected, directly or indirectly, to the sliding rod and configured to support the exercise assistance device, and a mounting guider including a guider body installed on the sliding rod, a damper connected, directly or indirectly, to the guider body, a damper gear rotatably connected, directly or indirectly, to the damper, a driving gear engaging with the damper gear, a first rod connected, directly or indirectly, to the driving gear in parallel with a rotation axis of the driving gear, and a second rod extending from the first rod in a direction intersecting with a longitudinal direction of the first rod.

The driving gear may include an engaging part in which gear teeth that engage with the damper gear are formed and an idling part that does not engage with the damper gear.

In a state in which no external force is applied to the second rod, the second rod may face vertically downward, and the driving gear may engage with the damper gear. While the second rod rotates in a direction toward the exercise assistance device, a part of the driving gear that faces the damper gear may be switched from the engaging part to the idling part.

The mounting guider may further include a guider housing configured to accommodate the damper gear and the driving gear, and the holder for the exercise assistance device may further include a guider spring having one end fixed to the guider housing and another end fixed to the driving gear.

BRIEF DESCRIPTION OF DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
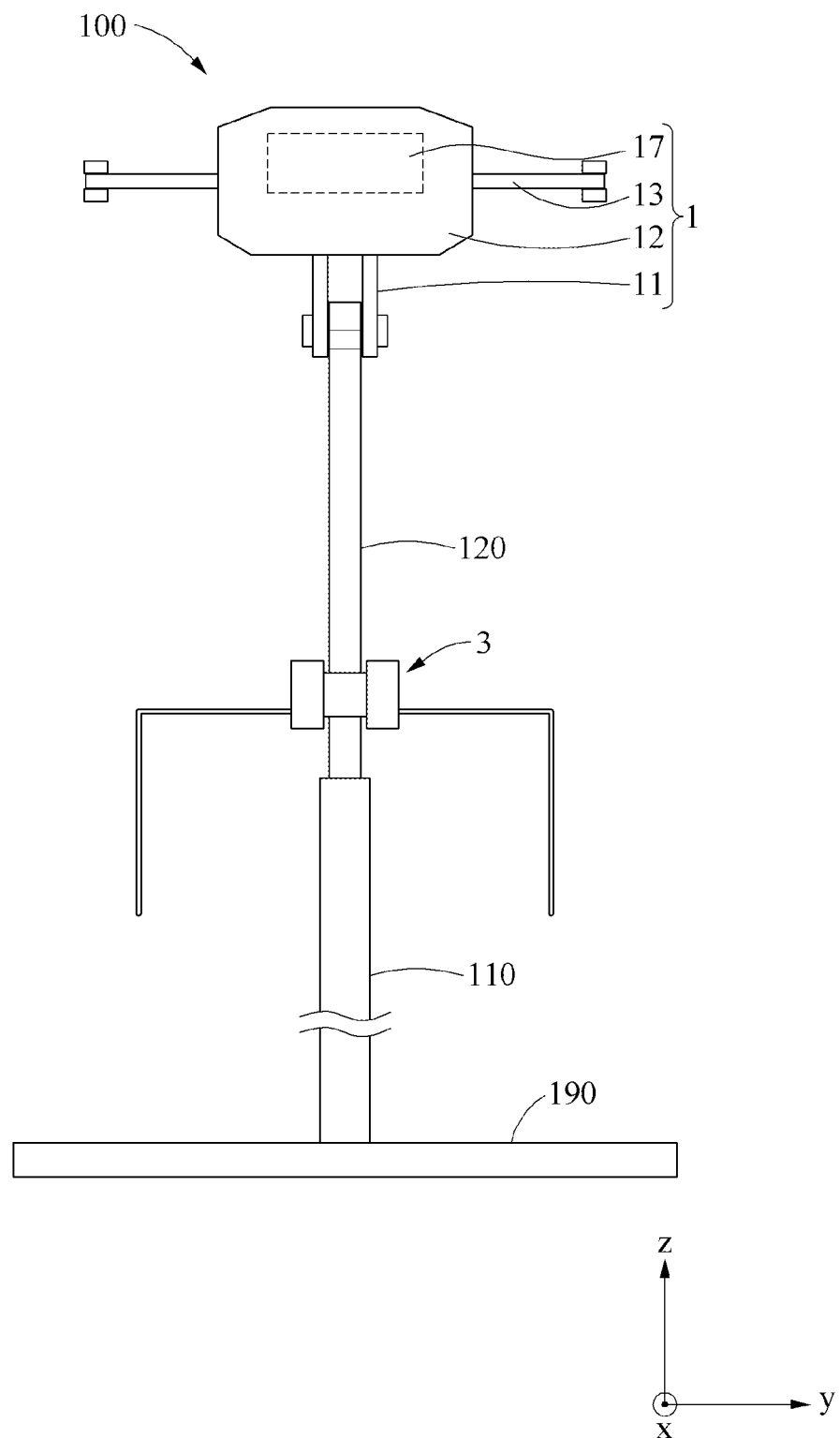
FIG. 1 is a front view of a holder for an exercise assistance device according to an example embodiment.

The following detailed structural or functional description is provided as an example only and various alterations and modifications may be made to the examples. Here, example embodiments are not to be construed as limited to the disclosure and should be understood as including all changes, equivalents, and replacements within the idea and the technical scope.

Terms, such as first, second, and the like, may be used herein to describe various components. Each of these terms is not used to define an essence, order or sequence of a corresponding component but is used merely to distinguish the corresponding component from other component(s). For example, a "first" component may be referred to as a "second" component, and similarly, the "second" component may be referred to as the "first" component.

It should be noted that if one component is described as being "connected", "coupled", or "joined" to another component, a third component(s) may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The same name may be used to describe an element included in the example embodiments described above and an element having a function in common. Unless otherwise mentioned, the descriptions of the example embodiments may be applicable to the following example embodiments and thus, duplicated descriptions will be omitted for conciseness.

Unless otherwise defined, all terms, including technical and scientific terms, used herein have the same meaning as is commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When the example embodiments are being described with reference to the accompanying drawings, like reference numerals refer to like elements and any repeated description related thereto has been omitted.

Figure 2:
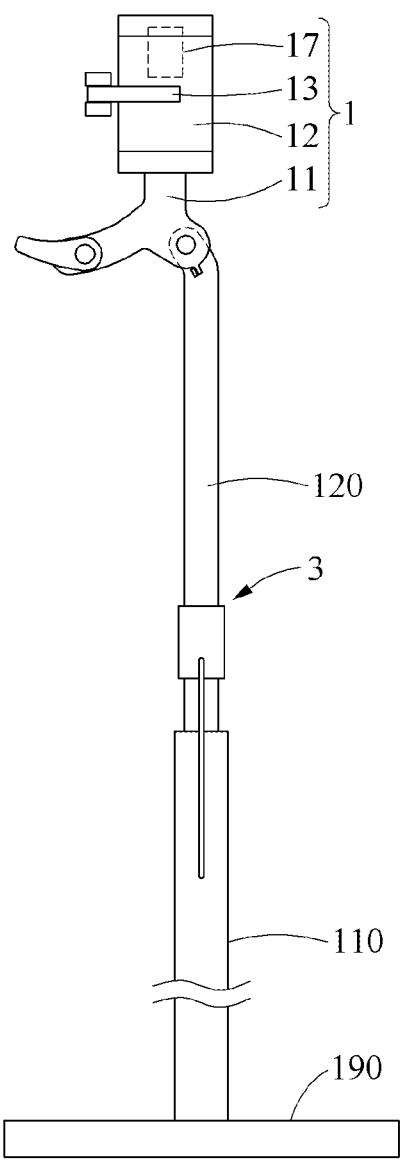
FIG. 2 is a side view of a holder for an exercise assistance device according to an example embodiment.

FIG. 1 is a front view of a holder for an exercise assistance device according to an example embodiment, and FIG. 2 is a side view of a holder for an exercise assistance device according to an example embodiment.

Referring to FIGS. 1 and 2, a holder 100 for an exercise assistance device may support an exercise assistance device (not shown) for assisting a user in exercising. For example, the exercise assistance device may be a walking assistance device that may assist the user in walking. For example, the holder 100 for the exercise assistance device may support the exercise assistance device that assists the user in walking. For example, the holder 100 for the exercise assistance device may support the exercise assistance device by separating the exercise assistance device upward from a ground, for example, by separating the exercise assistance device from the ground to a proper extent such that the exercise assistance device is positioned at a right height for a height of the user.

The holder 100 for the exercise assistance device may include a main base 190 seated on the ground, a main rod 110 extending upward from the main base 190, a sliding rod 120 slidably connected, directly or indirectly, to the main rod 110, a gripper 1 installed on an upper end of the sliding rod 120, a gravity compensation part (not shown) provided inside the main rod 110 and supporting the sliding rod 120, and a mounting guider 3 installed on the sliding rod 120 and positioned below the gripper 1.

An area on which the main base 190 is seated may be larger than an area on which the main rod 110 is seated such that the holder 100 for the exercise assistance device may remain in its pose while supporting the exercise assistance device. Although the drawings illustrate that the main base 190 is a square-shaped plate, the shape of the main base 190 is not limited thereto. For example, the main base 190 may have different shapes, for example, circular or oval, or may be a plurality of branched rods.

The sliding rod 120 may slide in a longitudinal direction, that is, a z-axis direction, of the main rod 110. Although the drawings illustrate that the main rod 110 has a sliding space therein and that the sliding rod 120 is slidably inserted into the main rod 110, examples are not limited thereto. For example, the sliding rod 120 may have a sliding space therein, and the main rod 110 may be slidably inserted into the sliding rod 120.

The gripper 1 may support a part of the wearable device (e.g., exercise assistance device) that supports a back of the user. The mounting guider 3 may be inserted into an inner space of a thigh band of the exercise assistance device that encloses a thigh of the user and may set a position of the thigh band.

The gripper 1 may include a gripper base 11 rotatably connected, directly or indirectly, to the sliding rod 120, a gripper head 12 connected, directly or indirectly, to an upper side of the gripper base 11 and facing a rear surface of the exercise assistance device, a gripper arm 13 rotatably connected, directly or indirectly, to the gripper head 12, and a controller 17 that controls an operation of the gripper arm 13. The controller 17 may be provided on the gripper head 12, but examples are not limited thereto. For example, the controller 17 may be provided on the sliding rod 120 or the main rod 110.

When the exercise assistance device is disposed on the gripper base 11, the gripper base 11 may rotate with respect to the sliding rod 120 and tilt forward. In other words, the gripper base 11 may rotate around a y-axis in a counter-clockwise direction. The controller 17 may recognize the gripper base 11 is tilting and move the gripper arm 13 such that at least a portion of the gripper arm 13 may cover a front surface of the exercise assistance device.

The gripper arm 13 may prevent or reduce the chance of the wearable device (e.g., exercise assistance device) from falling forward (e.g., in a +x direction). Even if the holder 100 for the exercise assistance device receives an impact, since the gripper arm 13 may cover the front surface of the exercise assistance device, separation of the exercise assistance device from the holder 100 for the exercise assistance device may be prevented or reduced.

Figure 3:
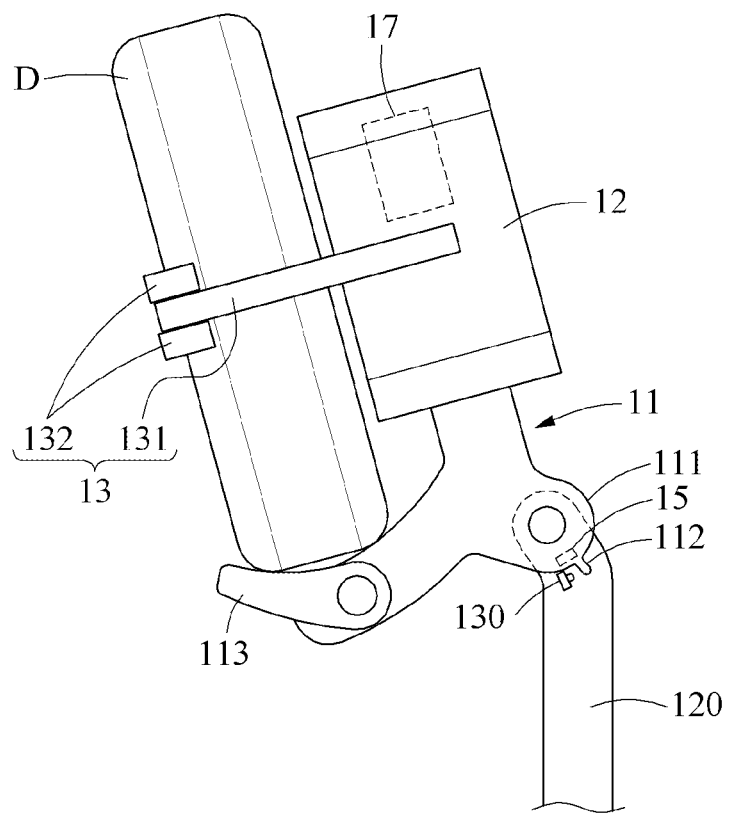
FIG. 3 is a side view illustrating an exercise assistance device that is disposed on a gripper according to an example embodiment.
Figure 4:
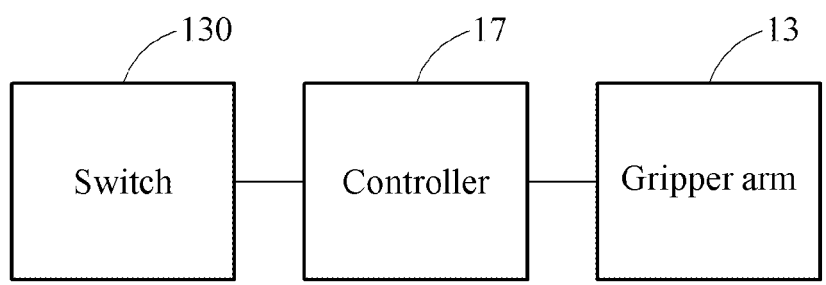
FIG. 4 is a block diagram of a switch, a controller, and a gripper arm according to an example embodiment.
Figure 5:
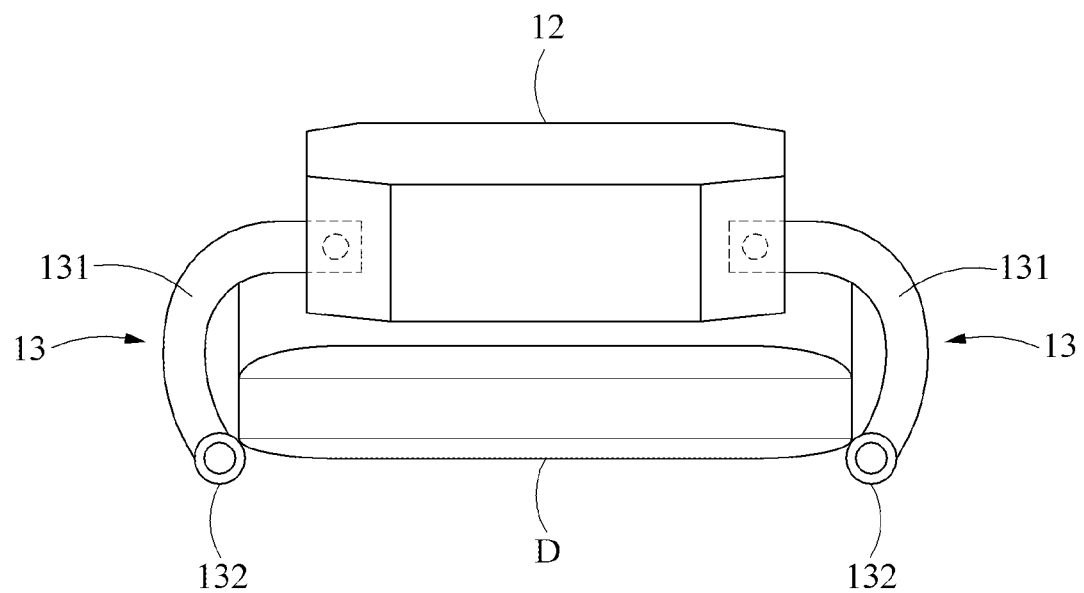
FIG. 5 is a plan view of a cradle and an exercise assistance device of FIG. 3 viewed from above.

FIG. 3 is a side view illustrating an exercise assistance device that is disposed on a gripper according to an example embodiment, FIG. 4 is a block diagram of a switch, a controller, and a gripper arm according to an example embodiment, and FIG. 5 is a plan view of a cradle and an exercise assistance device of FIG. 3 viewed from above.

Referring to FIGS. 3 through 5, a holder for an exercise assistance device may further include a switch 130 installed on the sliding rod 120. The switch 130 may contact the gripper base 11 while the gripper base 11 rotates. The switch 130 may transmit an electrical signal to the controller 17. For example, the switch 130 may include a button and transmit an on-off signal to the controller 17 according to whether the button is pressed.

While a main body D of the exercise assistance device is disposed on the gripper base 11, the gripper base 11 may tilt forward. In other words, the gripper base 11 may rotate around an axis provided at the sliding rod 120. Here, the main body D may be a part of the exercise assistance device that faces a back portion of the user.

While the main body D of the exercise assistance device is disposed on the gripper base 11, the switch 130 may contact the gripper base 11 and transmit an on signal to the controller 17. Meanwhile, while the main body D of the exercise assistance device is disposed on the gripper base 11, the switch 130 may be spaced apart from the gripper base 11 and transmit an off signal to the controller 17. In response to a signal transmitted from the switch 130 being switched, the controller 17 may control an operation of the gripper arm 13.

For example, the gripper base 11 may include a base body 111 rotatably connected, directly or indirectly, to the sliding rod 120, a protruding part 112 protruding from the base body 111, and a finger 113 connected, directly or indirectly, to a lower end of the base body 111.

The protruding part 112 may interfere with the switch 130 while the base body 111 rotates. The switch 130 is illustrated positioned in front (a +x direction) of the protruding part 112, but examples are not limited thereto. For example, the switch 130 may be positioned behind (a −x direction) the protruding part 112.

The finger 113 may be installed on a lower side of the base body 111 to have an adjustable angle. For example, an angle of the finger 113 may be adjusted based on an axis parallel to a rotation axis of the base body 111. The angle of the finger 113 may be adjusted according to a size of the main body D of the exercise assistance device.

The gripper arm 13 may include an arm body 131 rotatably connected to the gripper head 12 and an arm head 132 formed on an end of the arm body 131. The arm head 132 may be rounded and may directly contact the main body D of the exercise assistance device. The arm head 132 may be positioned in front (the +x direction) of the main body D and support the main body D to prevent or reduce the chance of the main body D from falling outwards.

The gripper may include a gripper spring 15 having one end fixed to the sliding rod 120 and another end fixed to the gripper base 11 and providing a restoring force to the gripper base 11. The gripper spring 15 may be, for example, a torsion spring. The gripper spring 15 may assist in restoring the gripper base 11 to its initial state when an external force is removed.

Figure 6:
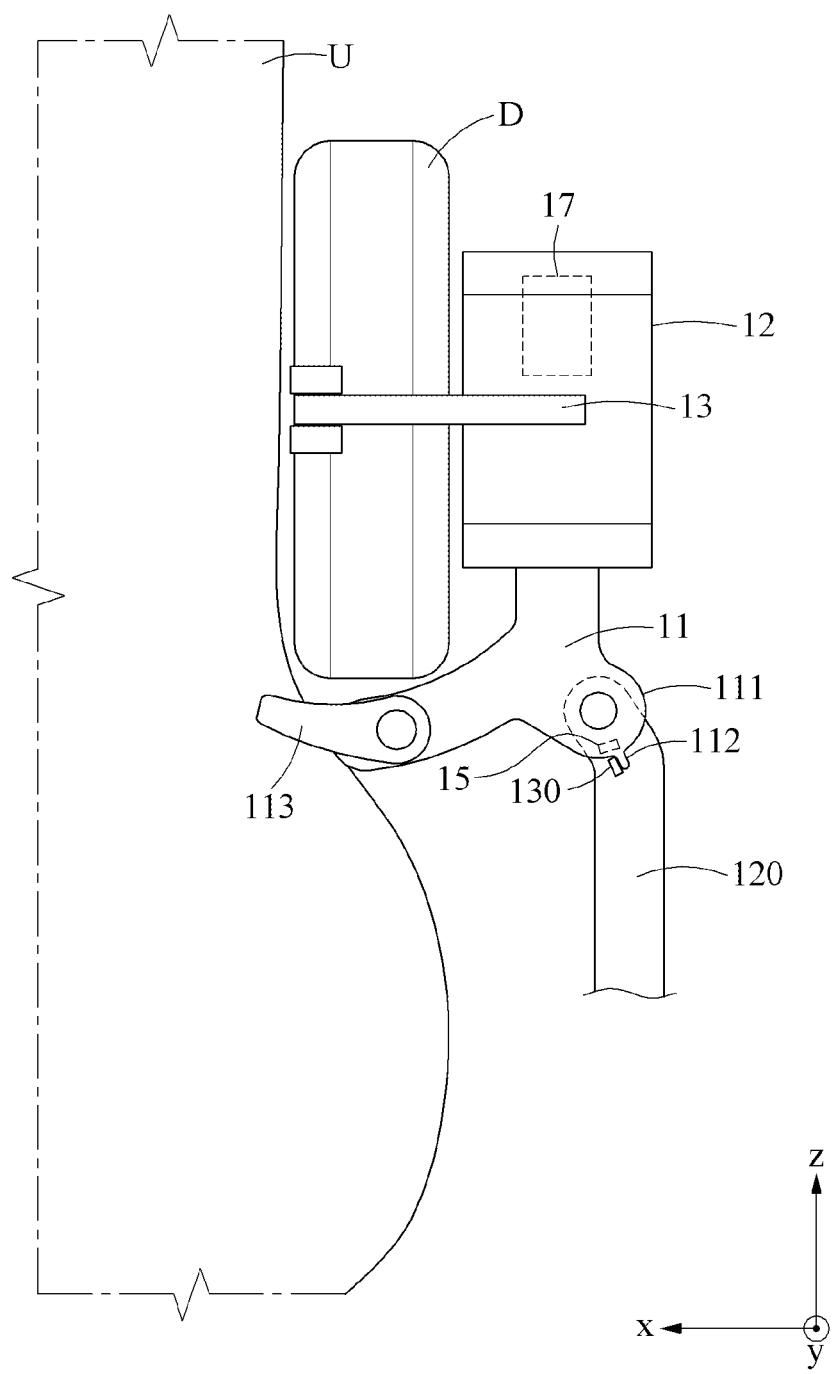
FIG. 6 is a side view schematically illustrating a user wearing an exercise assistance device that is disposed on a gripper according to an example embodiment.
Figure 7:
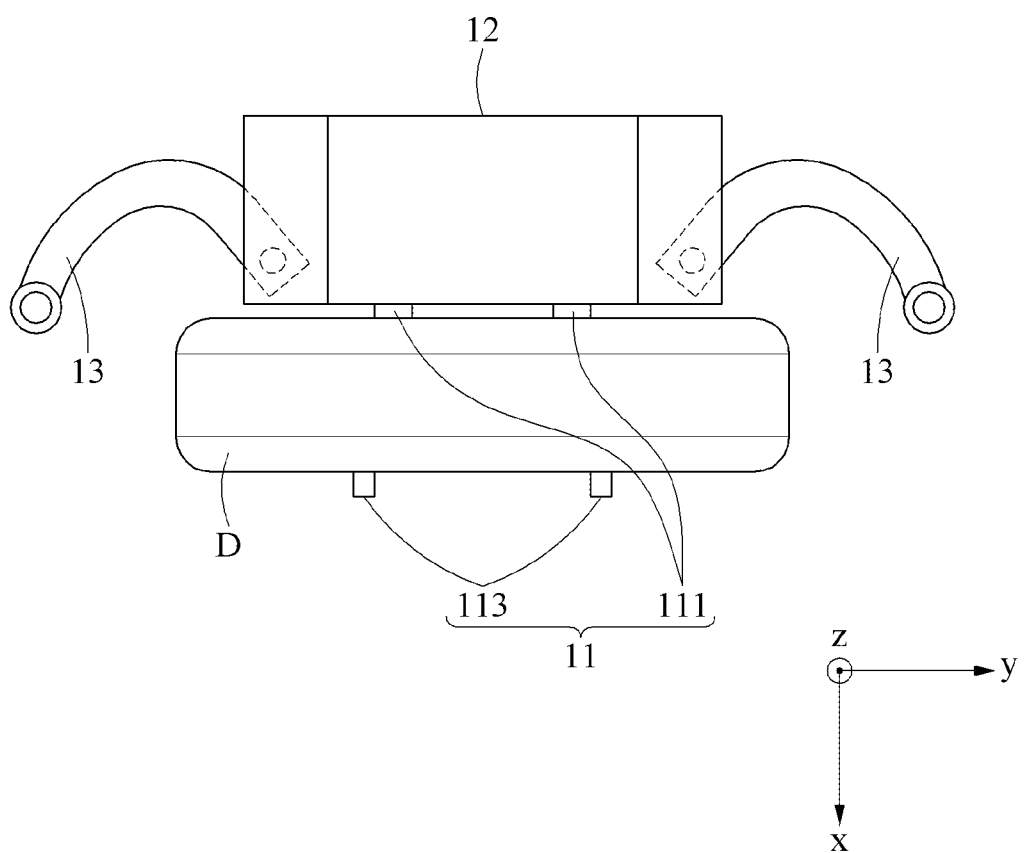
FIG. 7 is a plan view of a cradle and an exercise assistance device of FIG. 7 viewed from above.

FIG. 6 is a side view schematically illustrating a user wearing an exercise assistance device that is disposed on a gripper according to an example embodiment, and FIG. 7 is a plan view of a cradle and an exercise assistance device of FIG. 7 viewed from above.

Referring to FIGS. 6 and 7, when a user puts on an exercise assistance device mounted on a holder for the exercise assistance device, the main body D of the exercise assistance device may be pushed backward (in a −x direction) by a back U of the user. In this example, the gripper base 11 may rotate around a rotation axis in a clockwise direction, and the protruding part 112 of the gripper base 11 may contact the switch 130. The switch 130 may transmit an on signal to the controller 17, and the controller 17 may control an operation of the gripper arm 13 such that the gripper arm 13 moves outward. As a result, the gripper arm 13 may no longer cover the front face of the main body D. The user may move forward while wearing the exercise assistance device.

The switch 130 is previously described as being positioned in front of the protruding part 112, but the position of the switch 130 is not limited thereto. For example, the switch 130 may be positioned behind the protruding part 112, and in this case, the switch 130 may contact the protruding part 112 and transmit an on signal to the controller 17 while the main body D of the exercise assistance device is disposed on the gripper base 11.

Figure 8:
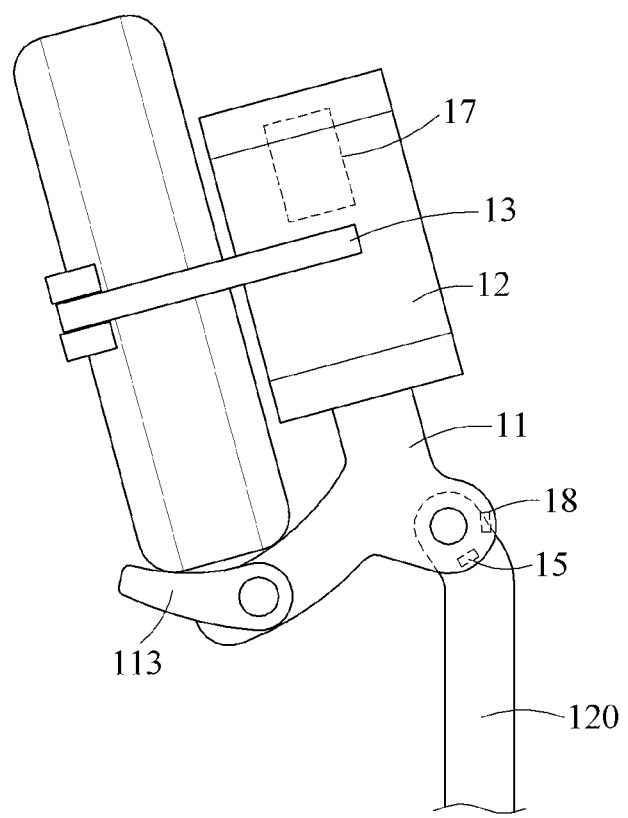
FIG. 8 is a side view illustrating an exercise assistance device that is disposed on a gripper according to an example embodiment.

FIG. 8 is a side view illustrating an exercise assistance device that is disposed on a gripper according to an example embodiment.

Referring to FIG. 8, a gripper may include an angle sensor 18 that may measure an angle formed by the gripper base 11 with respect to the sliding rod 120. The angle sensor 18 may transmit angle information to the controller 17, and the controller 17 (comprising processing circuitry) may control an operation of the gripper arm 13 based on the angle information sensed by the angle sensor 18.

Figure 9:
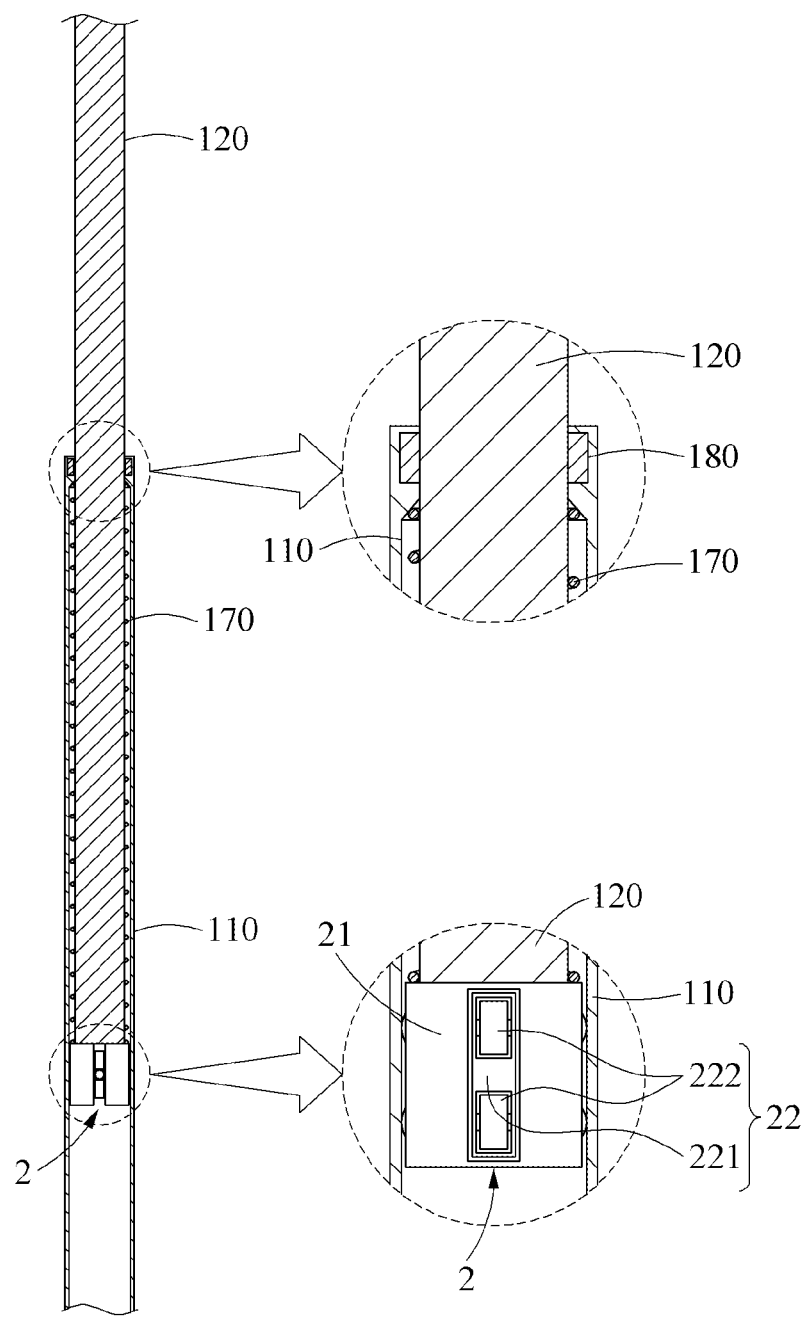
FIG. 9 is a cross-sectional view and a partially enlarged view of a holder for an exercise assistance device according to an example embodiment.
Figure 10:
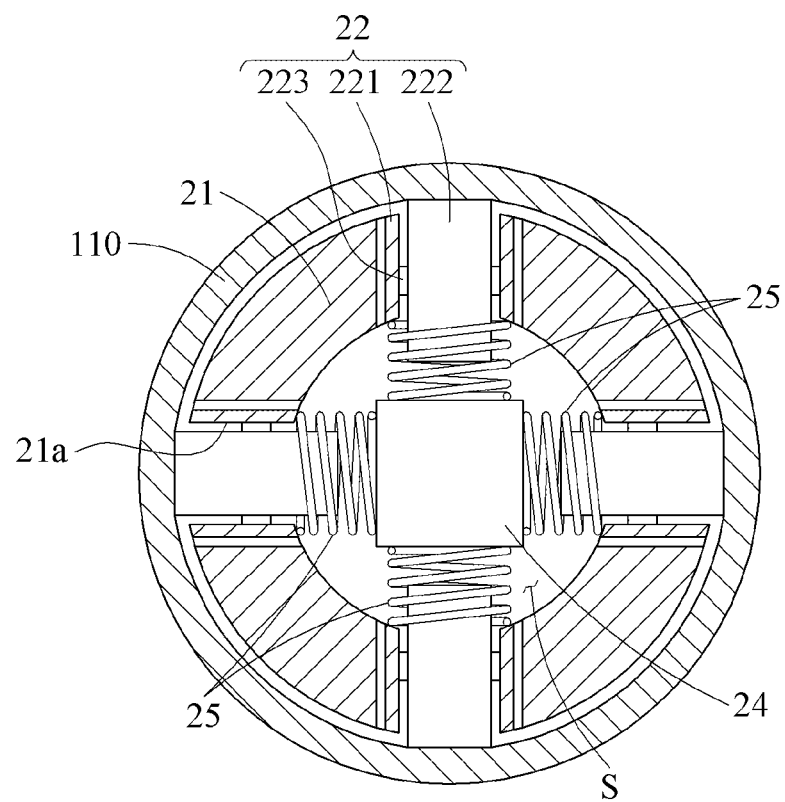
FIG. 10 is a cross-sectional view of a gravity compensation part according to an example embodiment.

FIG. 9 is a cross-sectional view and a partially enlarged view of a holder for an exercise assistance device according to an example embodiment. FIG. 10 is a cross-sectional view of a gravity compensation part according to an example embodiment, and FIG. 11 is a cross-sectional view of a gravity compensation part that is cut at an angle different from an angle of FIG. 10.

Each embodiment herein may be used in combination with any other embodiment(s) described herein.

Figure 11:
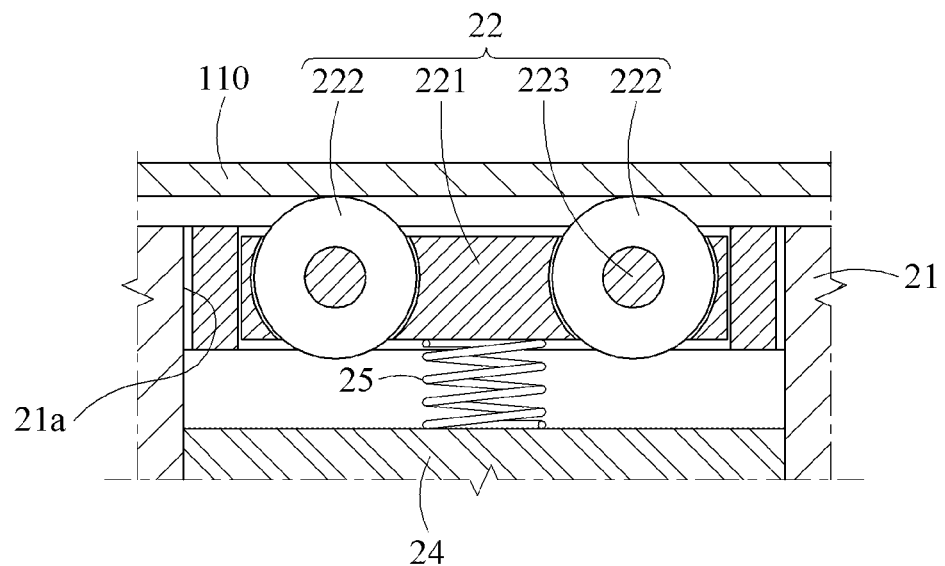
FIG. 11 is a cross-sectional view of a gravity compensation part that is cut at an angle different from an angle of FIG. 10 according to an example embodiment.

Referring to FIGS. 9 through 11, a holder for an exercise assistance device may include the main rod 110, the sliding rod 120 that may slide with respect to the main rod 110, a gripper (not shown) that is connected to the sliding rod 120 and may support the exercise assistance device, a gravity compensation part 2 that is provided inside the main rod 110 and may slide along the main rod 110 while supporting the sliding rod 120, a gravity compensation spring 170 having an upper end fixed to the main rod and a lower end fixed to the gravity compensation part 2, and a contact ring 180 that is provided on an upper end of the main rod 110 and contacts the sliding rod 120. The contact ring 180 may include, for example, polytetrafluoroethylene (PTFE), also known as Teflon, and the like.

The gravity compensation spring 170 may remain stretched while the exercise assistance device is disposed on the gripper (not shown) and help the user lift up the exercise assistance device that is disposed on the gripper using a small force by providing a restoring force to the gravity compensation part 2.

The gravity compensation part 2 may include a slider 21 that supports the sliding rod 120 and has an accommodation space S therein, a core part 24 that is provided in the accommodation space of the slider 21, a moving part 22 that may move with respect to the slider 21 and be in close contact with an inner side surface of the main rod 110, and a sub-spring 25 that connects the core part 24 and the moving part 22. The moving part 22 may move with respect to the slider 21 in a direction perpendicular to a longitudinal direction of the main rod 110. A plurality of moving parts 22 and sub-springs 25 may be provided to enclose the core part 24. The sub-spring 25 in a compressed state may be provided between the core part 24 and the moving part 22.

The moving parts 22 may be spaced apart from each other at a predetermined interval in a circumferential direction of the core part 24. For example, as illustrated in the drawings, four moving parts 22 may be provided and spaced apart from each other at 90-degree intervals in the circumferential direction of the core part 24. As another example, two, three, or five or more moving parts 22 may be provided. Based on such a structure, the gravity compensation part 2 may be stably in close contact with an inner side surface of the main rod 110.

The slider 21 may include a slider hole 21a penetrating in a direction perpendicular to a longitudinal direction of the main rod 110, and the moving part 22 may move along the slider hole 21a.

The moving part 22 may include a moving body 221 that is connected, directly or indirectly, to the sub-spring 25 and one or more of moving wheels 222 that are rotatably installed on the moving body 221 and contact the inner side surface of the main rod 110. One or more of the moving wheels 222 may include a first moving wheel and a second moving wheel that are spaced apart in a longitudinal direction of the moving body 221, and the sub-spring 25 may be connected to the moving body 221 between the first moving wheel and the second moving wheel. Based on such a structure, an elastic force transmitted from the sub-spring 25 may be evenly distributed to the first moving wheel and the second moving wheel.

The moving wheel 222 may move along the inner side surface of the main rod 110 while being in surface contact with the inner side surface of the main rod 110. For example, a part of the inner side surface of the main rod 110 that faces the moving wheel 222 may be flat. As another example, when an inner side hollow space of the main rod 110 is completely cylindrical, the moving wheel 222 may be curved, the curvature corresponding to the inner side surface of the main rod 110 to be in surface contact with the inner side surface of the main rod 110. For example, the moving wheel 222 may have a rubber pad on an outer surface to increase a contact area.

Figure 12:
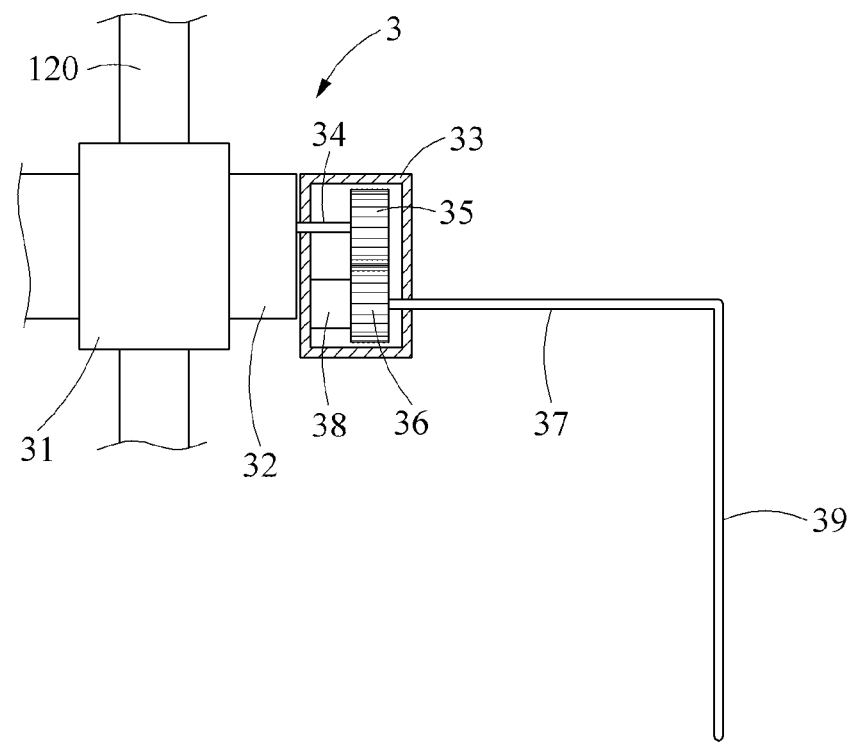
FIG. 12 is a front view schematically illustrating a mounting guider that is partially cut according to an example embodiment.
Figure 13:
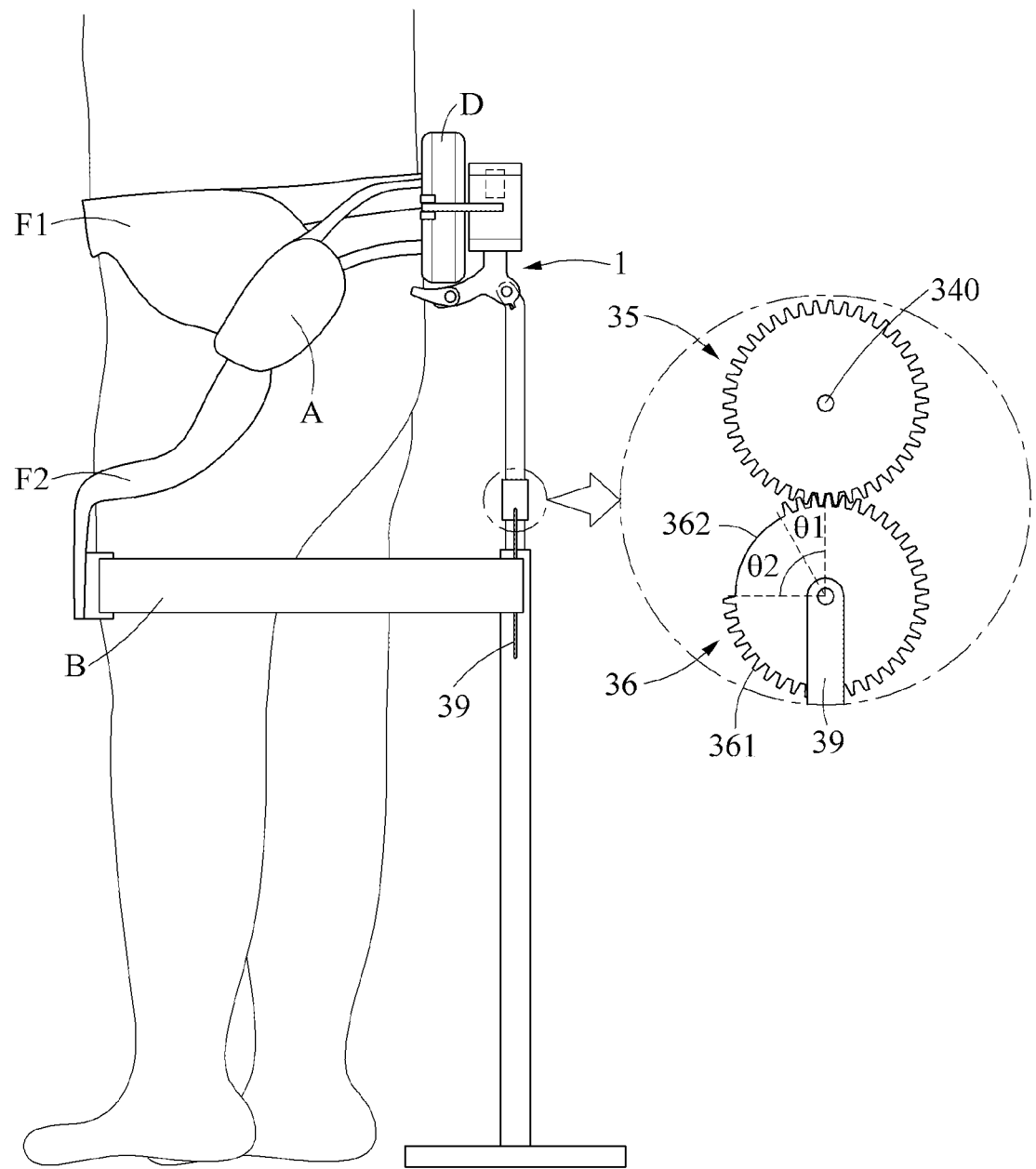
FIGS. 13-15 are side views and partially enlarged views schematically illustrating a user wearing an exercise assistance device that is disposed on a holder for an exercise assistance device and moving forward according to an example embodiment(s).
Figure 14:
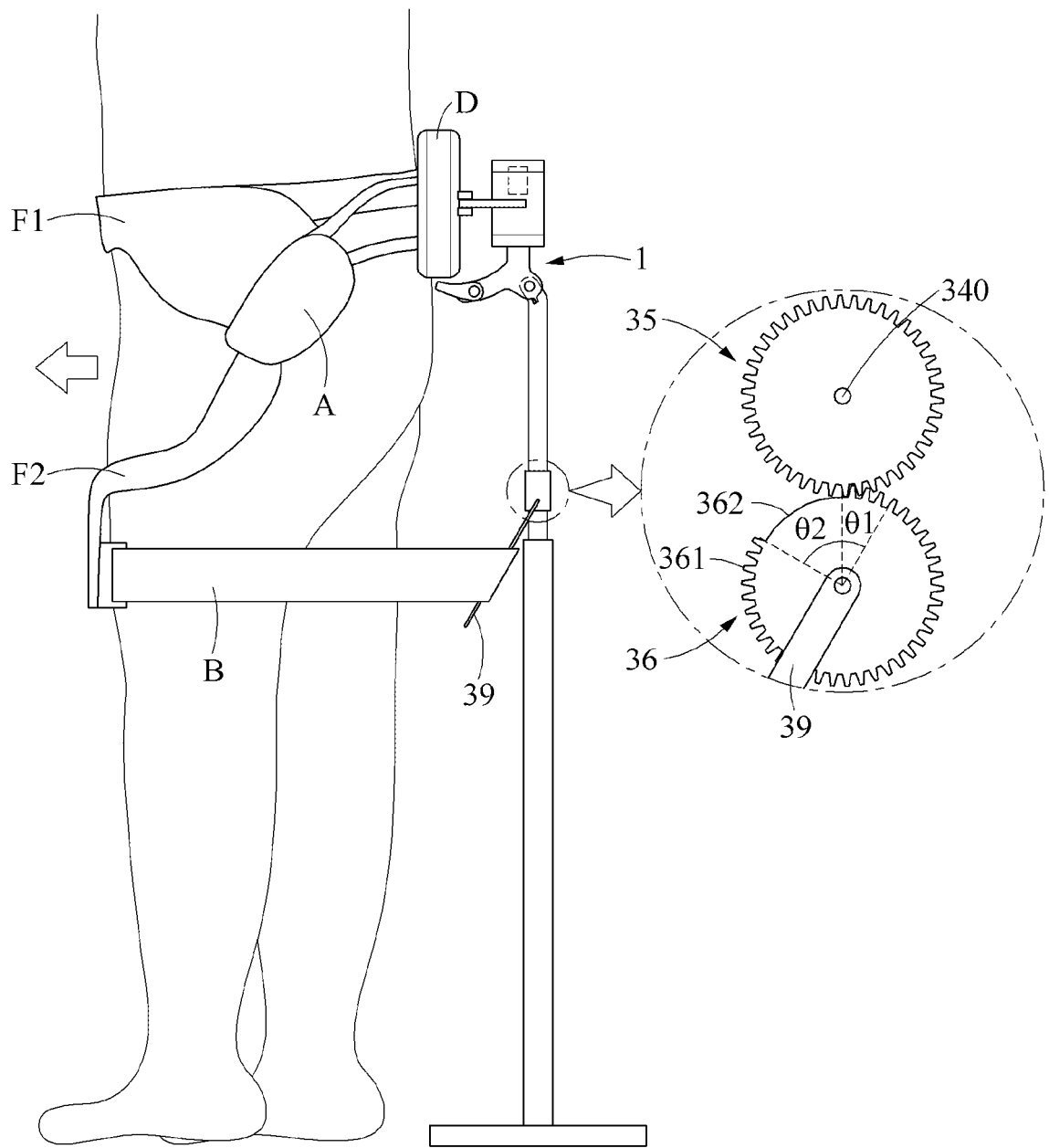
Figure 15:
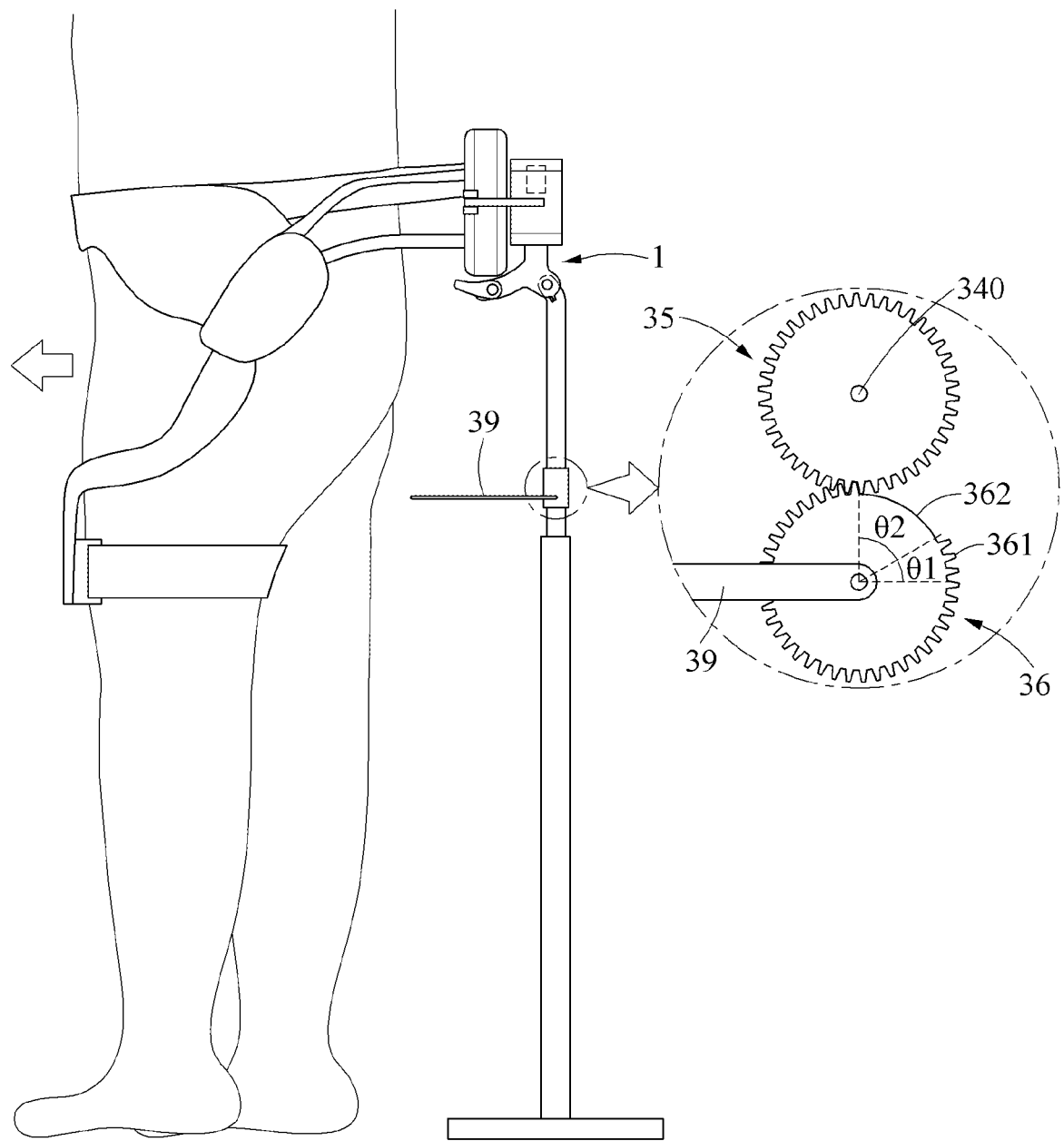

FIG. 12 is a front view schematically illustrating a mounting guider that is partially cut according to an example embodiment. FIGS. 13 through 15 are side views and partially enlarged views schematically illustrating a user putting on an exercise assistance device that is disposed on a holder for an exercise assistance device and moving forward according to an example embodiment.

Referring to FIGS. 12 and 13, a holder for an exercise assistance device may be mounted on or include the sliding rod 120 and include a mounting guider 3 that helps a user easily put a thigh band B of the exercise assistance device around his or her thigh, the thigh band B having elasticity.

The mounting guider 3 may provide a relatively rigid support to the thigh band B for a predetermined period from a time point at which the user starts to move forward while putting on the exercise assistance device. Through such a mechanism, the mounting guider 3 may assist the user who is moving forward while putting on the exercise assistance device causing the thigh band B to stretch. Meanwhile, when the user moves forward farther than a predetermined point, the mounting guider 3 may separate from the thigh band B, and a restoring force may provide the thigh band B with the ability to wind around the thigh of the user.

The exercise assistance device may include the main body D that supports a back of the user, a torso frame F1 worn on a torso of the user, an actuator A disposed on the torso frame F1, a thigh frame F2 that rotates by receiving power from the actuator A, and the thigh band B connected to the thigh frame F2 and worn around the thigh of the user.

The thigh band B may have elasticity. While the main body D is seated on the gripper 1 of a cradle, the mounting guider 3 may be provided inside the thigh band B. When the user moves forward while putting on the torso frame F1 and positioning a thigh inside the thigh band B, the thigh band B may be stretched while in a state of being engaged with the mounting guider 3. When the user moves forward farther than a predetermined distance, the thigh band B may separate from the mounting guider 3, and the restoring force may provide the thigh band B with the ability to wind around the thigh of the user.

The mounting guider 3 may include a guider body 31 installed on the sliding rod 120, a damper 32 connected to the guider body 31, a damper gear 35 rotatably connected, directly or indirectly, to a drive shaft 34 of the damper 32, a driving gear 36 engaging with the damper gear 35, a first rod 37 connected to the driving gear 36 in parallel with a rotation axis of the driving gear 36, and a second rod 39 extending from the first rod 37. The mounting guider 3 may include a guider housing 33 that accommodates the damper gear and the driving gear 36 and a guider spring 38 provided between the guider housing 33 and the driving gear 36.

In a state in which no external force is being applied to the second rod 39, the second rod 39 may face downward due to gravity.

The driving gear 36 may include an engaging part 361 in which gear teeth that engage with the damper gear 35 are formed and an idling part 362 that does not engage with the damper gear 35. Based on a circumference of the driving gear 36, for example, a sector with a 300-degree central angle may be the engaging part 361, and a remaining sector with a 60-degree central angle may be the idling part 362. Meanwhile, gear teeth may be formed around the entire damper gear 35.

While not being pulled by the thigh band B, the second rod 39 may face vertically downward, and the engaging part 361 may engage with the damper gear 35. In this example, a central angle of a sector Θ1 formed by two radii and an arc from a point at which the driving gear 36 engages with the damper gear 35 counterclockwise to a point at which the idling part 362 starts may be, for example, 30 degrees. A central angle of a sector Θ2 formed by the idling part 362 may be, for example, 60 degrees.

When the user moves forward while putting on the exercise assistance device, the second rod 39 may be pulled by the thigh band B, and the driving gear 36 may rotate in a clockwise direction. In the sector Θ1, the driving gear 36 may rotate while engaging with the damper gear 35, and resistance to the rotation of the driving gear 36 may be generated by the damper 32. Based on such a structure, when the user moves forward, the thigh band B may be stretched, and potential energy of the thigh band B may increase.

When the user moves forward a distance more than a predetermined distance, a part of the driving gear 36 that faces the damper gear 35 may be switched from the engaging part 361 to the idling part 362, and the driving gear 36 may rotate quickly without the resistance generated by the damper 32. In this example, the thigh band B may separate from the second rod 39 and contract in a direction toward the thigh of the user.

Even if the second rod 39 rotates in a clockwise direction due to inertia, the part of the driving gear 36 that faces the damper gear 35 may be switched from the idling part 362 to the engaging part 361, and rotational force of the driving gear 36 may be gradually reduced due to the resistance generated by the damper 32.

The guider spring 38 may assist in restoring the second rod 39 to its initial pose. One end of the guider spring 38 may be fixed to the guider housing 33, and another end of the guide spring 38 may be fixed to the driving gear 36. For example, the guider spring 38 may be in an initial state in which it is not deformed while the second rod 39 faces vertically downward and may have minimum or small potential energy. For example, the guider spring 38 may be deformed while the driving gear 36 rotates and provide a restoring force to the driving gear 36 such that the second rod 39 may face vertically downward again and stay in its position.

As described above, although the example embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

Therefore, other implementations, other example embodiments, and/or equivalents of the claims are within the scope of the following claims.

The invention claimed is:

1. A holder for holding an exercise assistance device, the holder comprising:
   a main rod;
   a sliding rod configured to be slidable with respect to the main rod; and
   a gripper, comprising a gripper base, connected to the sliding rod and configured to support the exercise assistance device, a gripper head connected to an upper side of the gripper base and for-facing a rear surface of the exercise assistance device, and a gripper arm rotatably connected to the gripper head,
   wherein the gripper base is configured to rotate with respect to the sliding rod and tilt forward when the exercise assistance device is disposed on the gripper base, the gripper arm being pivotable relative to the gripper base between a position in which at least a portion of the gripper arm is disposed to cover a front surface of at least part of the exercise assistance device and an outward position in which the gripper arm does not cover the front surface, the holder further comprising a switch installed on the sliding rod, configured to be in contact with the gripper base when the gripper forms a predetermined angle with respect to the sliding rod, and configured to provide an on-off signal to a controller comprising circuitry, wherein the controller is configured to control an operation of the gripper arm based on the on-off signal.

2. The holder of claim 1, wherein the gripper base comprises a base body rotatably connected to the sliding rod and a protruding part protruding from the base body.

3. The holder of claim 1, wherein the gripper further comprises a gripper spring having one end fixed to the sliding rod and another end fixed to the gripper base and configured to provide a restoring force to the gripper base.

4. The holder of claim 1, further comprising:

an angle sensor configured to measure an angle formed by the gripper base with respect to the sliding rod, wherein a controller, comprising circuitry, is configured to control an operation of the gripper arm based on angle information measured by the angle sensor.

5. The holder of claim 1, further comprising:

a gravity compensation part, comprising a slider, provided inside the main rod and configured to be slidable along the main rod while supporting the sliding rod; and a gravity compensation spring comprising an upper end fixed to the main rod and a lower end fixed to the gravity compensation part.

6. The holder of claim 5, wherein the gravity compensation part is in close contact with an inner side surface of the main rod such that the gravity compensation spring can remain in a deformed state.

7. The holder of claim 5, wherein the gravity compensation part comprises:

the slider, the slider being configured to support the sliding rod and comprising an accommodation space therein;

a core part provided in the accommodation space of the slider;

a moving part movable with respect to the slider in a direction perpendicular to a longitudinal direction of the main rod and provided to be in close contact with an inner side surface of the main rod; and a sub-spring configured to connect the core part and the moving part.

8. The holder of claim 7, wherein the slider comprises a slider hole penetrating in a direction perpendicular to the longitudinal direction of the main rod, and the moving part is movable along the slider hole.

9. The holder of claim 7, wherein the moving part comprises:

a moving body connected to the sub-spring; and one or more of moving wheels rotatably installed on the moving body and provided to be in contact with the inner side surface of the main rod.

10. The holder of claim 1, further comprising:

a mounting guider comprising a guider body installed on the sliding rod, a damper connected to the guider body, a damper gear rotatably connected to the damper, a driving gear for engaging with the damper gear, a first rod connected to the driving gear in parallel with an axis of the driving gear, and a second rod extending from the first rod in a direction intersecting with a longitudinal direction of the first rod.

11. The holder of claim 10, wherein the driving gear comprises an engaging part in which gear teeth that engage with the damper gear are formed and an idling part that does not engage with the damper gear.

12. The holder of claim 11, wherein, the holder is configured so that in a state in which no external force is applied to the second rod, the second rod is to face vertically downward, and the driving gear is to engage with the damper gear.

13. The holder of claim 12, wherein, the holder is configured so that when the second rod rotates in a direction toward the exercise assistance device, a part of the driving gear facing the damper gear is to be switched from the engaging part to the idling part.

14. The holder of claim 10, wherein:

the mounting guider further comprises a guider housing configured to accommodate the damper gear and the driving gear, and the holder further comprises a guider spring having one portion fixed to the guider housing and another portion fixed to the driving gear.

15. A holder for holding an exercise assistance device, the holder comprising:

a main rod;

a sliding rod configured to be slidable with respect to the main rod; and a gripper comprising a gripper base connected to the sliding rod and configured to support the exercise assistance device, a gripper head connected to an upper side of the gripper base and facing a rear surface of the exercise assistance device, and a gripper arm rotatably connected to the gripper head, wherein the gripper base is configured to rotate with respect to the sliding rod and tilt forward when the exercise assistance device is disposed on the gripper base, the gripper arm being displaceable relative to the gripper base such that at least a portion of the gripper arm is disposed to cover a front surface of at least part of the exercise assistance device, and wherein the gripper further comprises a gripper spring having one end fixed to the sliding rod and another end fixed to the gripper base and configured to provide a restoring force to the gripper base.

* * * * *